United States Patent
Hori et al.

(10) Patent No.: US 6,175,466 B1
(45) Date of Patent: Jan. 16, 2001

(54) LIBRARY UNIT HAVING A CARTRIDGE TRANSFER ROBOT WITH A ROTATABLE PICKER SECTION

(75) Inventors: Daisuke Hori, Kawasaki; Hiroshi Shibuya, Tokyo; Nobuhiko Motoyama, Kawasaki; Chikatsu Kato, Yokohama, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/131,062

(22) Filed: Aug. 7, 1998

(30) Foreign Application Priority Data

Dec. 2, 1997 (JP) ...................................... 9-331539

(51) Int. Cl.⁷ ........................... G11B 15/68; G11B 17/04; B65G 1/00
(52) U.S. Cl. .............................. 360/92; 369/178; 414/277
(58) Field of Search .............................. 360/92; 369/178, 369/180; 414/277

(56) References Cited

U.S. PATENT DOCUMENTS

| 4,932,826 | * | 6/1990 | Moy | ........................................ | 360/92 |
| 5,143,193 | * | 9/1992 | Geraci | ................................... | 414/277 |
| 5,631,785 | * | 5/1997 | Dang | ....................................... | 360/92 |

FOREIGN PATENT DOCUMENTS

| 5347063 | 12/1993 | (JP) . |
| 6096507 | 4/1994 | (JP) . |
| 9007259 | 1/1997 | (JP) . |

* cited by examiner

*Primary Examiner*—A. J. Heinz
(74) *Attorney, Agent, or Firm*—Greer, Burns & Crain, Ltd.

(57) ABSTRACT

An accessor includes a drive mechanism having a direct drive swivel mechanism which does not utilize a timing belt, and reduces the required installation space while maintaining a high degree of positioning accuracy. The direct drive swivel mechanism preferably includes an external gear mounted coaxially to the swivel axis of the picker section and integrated into the picker section, an internal gear meshing with the external gear, and a drive mechanism for directly driving the internal gear to swivel the picker section.

19 Claims, 13 Drawing Sheets

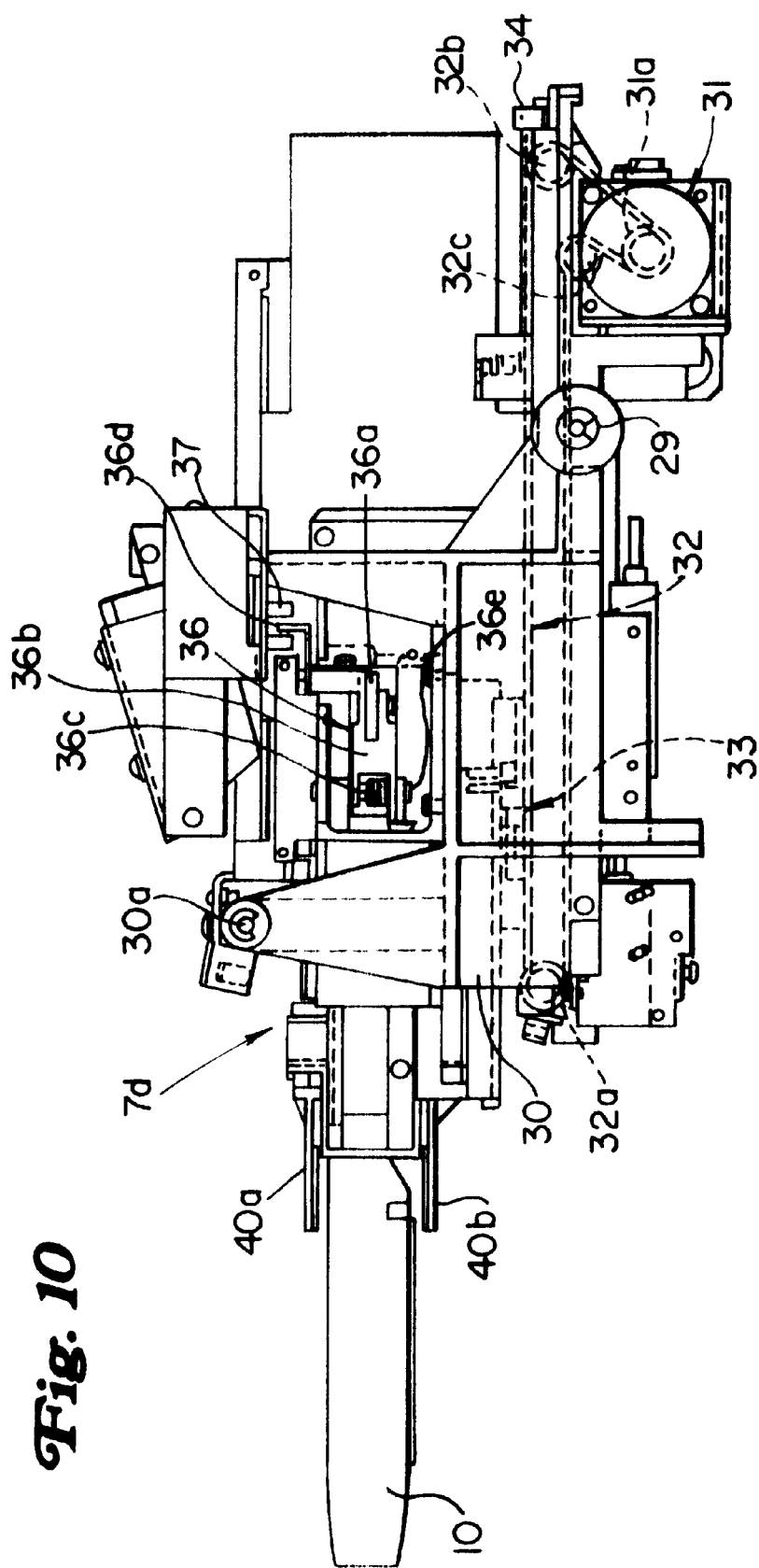

LIBRARY UNIT HAVING A CARTRIDGE TRANSFER ROBOT WITH A ROTATABLE PICKER SECTION

FIELD OF THE INVENTION

The present invention generally relates to a cartridge transfer robot for conveying a recording medium cartridge between a storage rack, a cartridge access station and a deck within a library unit which houses a number of cartridges. The configuration of the cartridge transfer robot of the present invention enables a reduction in the operating space required for the robot by a drive gear inside of a rotating hub gear. The invention further relates to a library unit including the aforementioned cartridge transfer robot.

BACKGROUND OF THE INVENTION

In general, a library unit functions as a large scale external memory. The library unit is equipped with a number of lockers with storage shelves for housing thousands of recording media cartridges such as magnetic tapes. The unit facilitates large scale automated access operations for writing/reading data to/from each cartridge.

The entire structure of the accessor unit including the hand mechanism (hereinafter "picker section") must be rotatable about the cartridge insertion/ejection direction, because storage shelves are arranged on both sides of the aisle through which the accessor travels. Consequently, the accessor must be equipped with a swivel mechanism to swivel its picker section.

FIGS. 17 and 18 respectively show a plan view and sectional view of a conventional swivel mechanism. As shown in FIG. 18, a shaft 100a is secured to the bottom of a picker section body 100 through a bearing 102 such that the shaft 100a is capable of swiveling on a flat base (swivel base) 101. Notably, the picker section body 100 is swiveled around a vertical axis when driven by a swivel drive motor (swivel motor) 120 via pulleys 120a, 121 and a timing belt 122.

The conventional accessor suffers from several disadvantages. The first disadvantage relates to the operating space requirements for the swivel mechanism. As shown in FIGS. 17 and 18, the configuration of pulleys 120a, 121 and the timing belt 122 of the swivel mechanism dictate that the swivel motor 120 be mounted away from the swiveling axis of the picker section body 100 (shaft 100a). Consequently, the operating space required for the conventional swivel mechanism conflict with the goal of space miniaturization.

A further disadvantage associated with conventional accessors relates to the cartridge delivery mechanism. The cartridge delivery mechanism is provided in a conventional library unit, because conventional hand mechanisms are unable to provide the degree of positioning accuracy required to insert/remove cartridges from the deck. For this reason, a conventional library apparatus is provided with a cartridge delivery mechanism (distinct from the hand mechanism), capable of providing required positioning accuracy. However, in order to downsize and reduce the cost of the library apparatus, it is desirable to omit the cartridge delivery mechanism. This in turn requires the accessor to perform the functions of loading/unloading a cartridge directly to/from the deck without the assistance of the cartridge delivery mechanism.

In order for the accessor to directly perform loading/unloading of a cartridge, the positioning accuracy at the head end of the hand mechanism must be significantly enhanced. However, the construction of a conventional swivel mechanism is designed for ease of maintenance rather than accuracy control. Notably, slack tends to develop, over time, in the timing belt 122, thereby reducing the accuracy control of the swivel mechanism.

OBJECTS OF THE INVENTION

Accordingly, an object of the present invention is to provide a cartridge transfer robot having a rotatable picker section which eliminates the need for a timing belt, thereby increasing accuracy control and reducing the size of the swivel mechanism within the picker section.

A further object of the invention is to reduce the mounting space of the picker section.

Still further an object of the invention is to improve the accuracy control of swivel mechanism and the head end of the hand mechanism, and eliminate the need for a distinct cartridge delivery mechanism.

SUMMARY OF THE INVENTION

The above listed objects are met or exceeded by the cartridge transfer robot of the present invention, which is used in a library unit having storage shelves for housing data storage cartridges, cartridge access stations to load or unload the cartridges, and decks to access the recording media within the cartridges.

Generally, in the preferred embodiment, the cartridge transfer robot includes a picker section for transferring cartridges, and includes a hand mechanism for chucking and inserting/extracting the cartridges from the decks. The cartridge transfer robot further includes a swivel mechanism for swiveling the picker section, and a transfer mechanism to move the picker section to a prescribed position. The swivel section includes one gear mounted coaxially to the swivel axis of the picker section and integrated into the picker section, a second gear meshing with the first gear inside the first gear, and a drive mechanism for driving the second gear which in turn drives the picker section.

The invention is used in a library apparatus including the above-described cartridge transfer robot. The library apparatus is provided with a storage rack for storing cartridges, a cartridge access station for inserting and removing cartridges from the library apparatus, and a deck for processing information stored on the cartridge. The cartridge transfer robot is used to transfer cartridges between the storage rack, the cartridge access station and the deck used.

According to the preferred embodiment, the picker section is operably connected to the first gear which is engaged with the second gear. In operation, the picker section is rotatably driven by the action of a drive mechanism on the second gear. Notably, the picker section is directly driven by the second gear engaged with the first gear without using a timing belt.

BRIEF DESCRIPTION OF THE DRAWINGS

A preferred embodiment of the present invention is described herein with reference to the drawings in which:

FIG. 10 is a side view of the hand assembly and picker section of FIG. 9;

DESCRIPTION OF THE PREFERRED EMBODIMENTS

Figure 2:
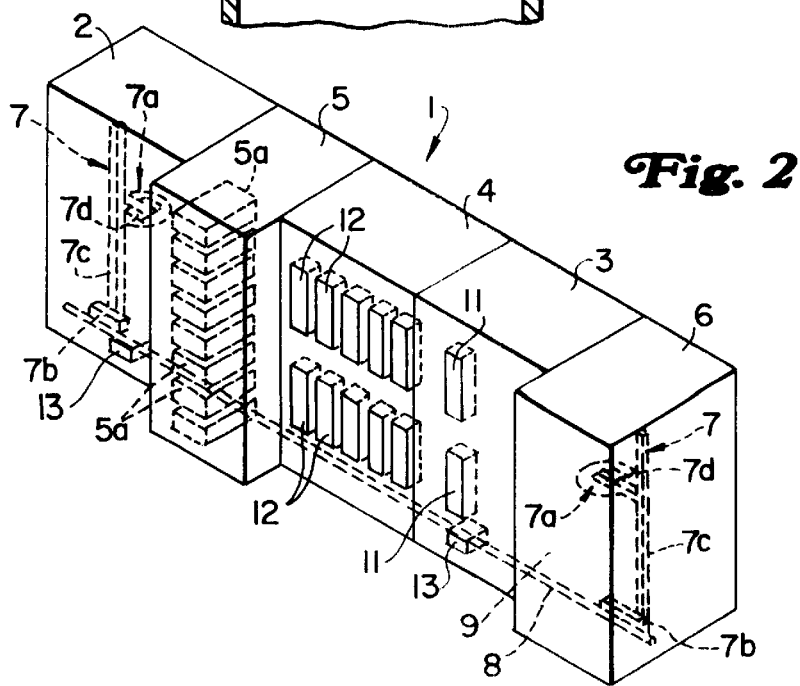
FIG. 2 is a plan view of the overall construction of a library unit including the accessor of FIG. 1(a)

FIG. 2 is a plan view showing the overall construction of a library unit 1 according to one embodiment of the present invention. The library unit 1 houses a number of tape cartridges 10 (FIGS. 9 and 10), and processes data stored in each tape cartridge 10.

The library unit 1 includes right and left accessor units 2 and 3 (hereinafter "LAU" and "RAU"), a cartridge storage unit 4 (hereinafter "CSU"), a cartridge mounting unit 5 (hereinafter "CMU") and an accessor extending unit 6 (hereinafter "AEU") all of which are operably connected together. A cartridge transfer robot 7 travels within a passage defined through the units, and transfers cartridges 10 between the respective units.

The LAU 2 and AEU 6 and function as garages for the accessor 7. The RAU 3 is provided with a pair of cartridge insertion/ejection mechanisms 11 (hereinafter "CAS") on a front surface (operator side). The CAS 11 is used to load or unload individual ones of the cartridge 10 to or from the library unit 1. A cartridge forced exit station (hereinafter "FES") 13 used to eject a failed cartridge to the outside is provided on the front side of the LAU 2 and the RAU 3.

Figure 1A:
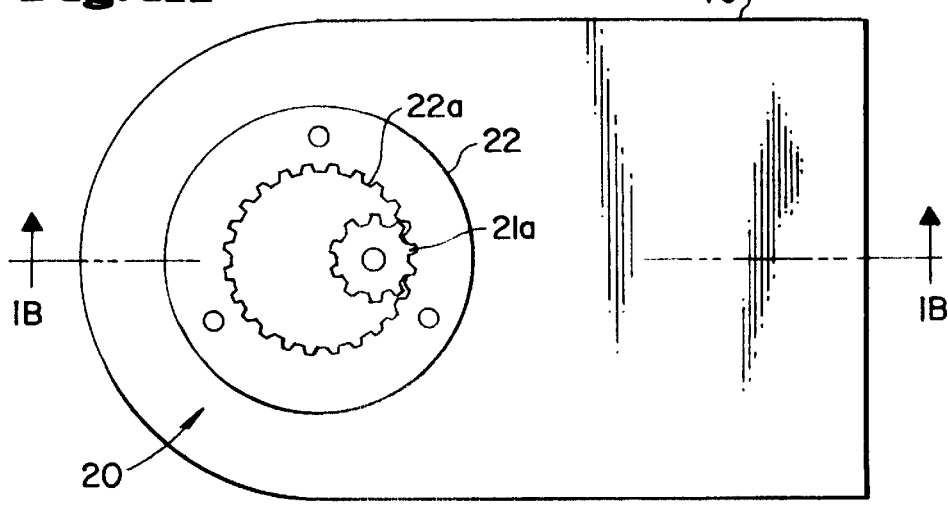
FIG. 1(a) is a plan view of the swivel mechanism in a cartridge transfer robot (accessor)
Figure 1B:
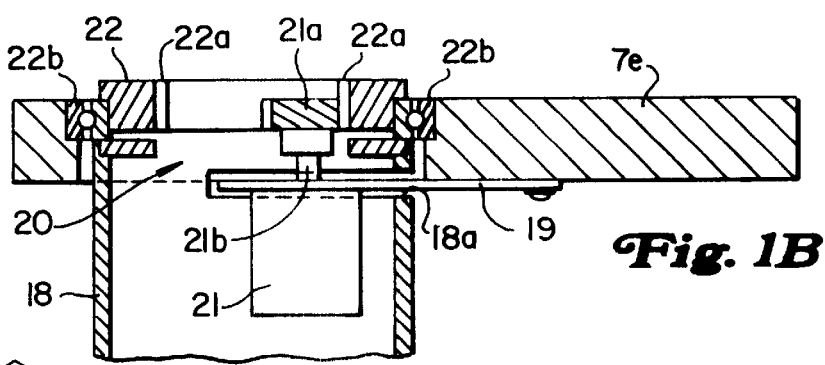
FIG. 1(b) is a cross-sectional view taken along lines 1B—1B in FIG. 1(a)

The CSU 4 stores plural ones of the cartridges 10, and in the embodiment depicted in FIG. 1 is provided with ten cartridge direct entry/exit mechanisms (hereinafter "DEE") 12. Each DEE 12 is fitted with a magazine (not shown) which houses multiple cartridges 10. Notably, the DEE 12 facilitates the simultaneous loading or unloading of multiple cartridges 10 to or from the library apparatus 1.

A storage shelf (not shown) having plural cells for housing cartridges 10 is provided on the inner walls of the LAU 2, RAU 3, and CSU 4. The cartridges 10 entered into the library unit 1 via the CAS 11 or the DEE 12 are ultimately housed in prescribed cells of the storing shelf by the accessor 7.

The CMU 5 is provided with multiple decks 5a (8 units shown in FIG. 2). Each deck 5a performs write/read operations to/from the magnetic media within the cartridge 10.

As shown in FIG. 2, an accessor passage 9 is defined through each of the respective units 2 to 6 of the library unit 1. A horizontal rail 8 guides the accessors 7 through the accessor passage 9. Each accessor 7 has a hand mechanism 7d (see FIGS. 15 and 16) used for gripping the cartridge during loading/unloading of the cartridge 10 from the deck. Each accessor 7 is further equipped with a cart 7b which moves along the rail 8 in the horizontal direction, a vertical column 7c which guides the hand assembly 7a on the cart 7b in the vertical direction, and a moving mechanism for moving the hand assembly 7a (including the hand mechanism 7d) to a predetermined position. The configuration and function of the accessors 7 will be described later in detail, with reference to FIG. 1 and FIGS. 3 to 16.

In response to a command from an upper control apparatus (host device) a designated cartridge 10 from among the numerous cartridges 10 stored in the storage shelf is chucked and taken out by the hand mechanism 7d. The cartridge is transported through the accessor passage 9 to the deck 5a of the CMU 5 by the accessor 7, and is inserted into the deck 5a by the hand mechanism 7d.

Description of Overall Accessor Construction

Figure 3:
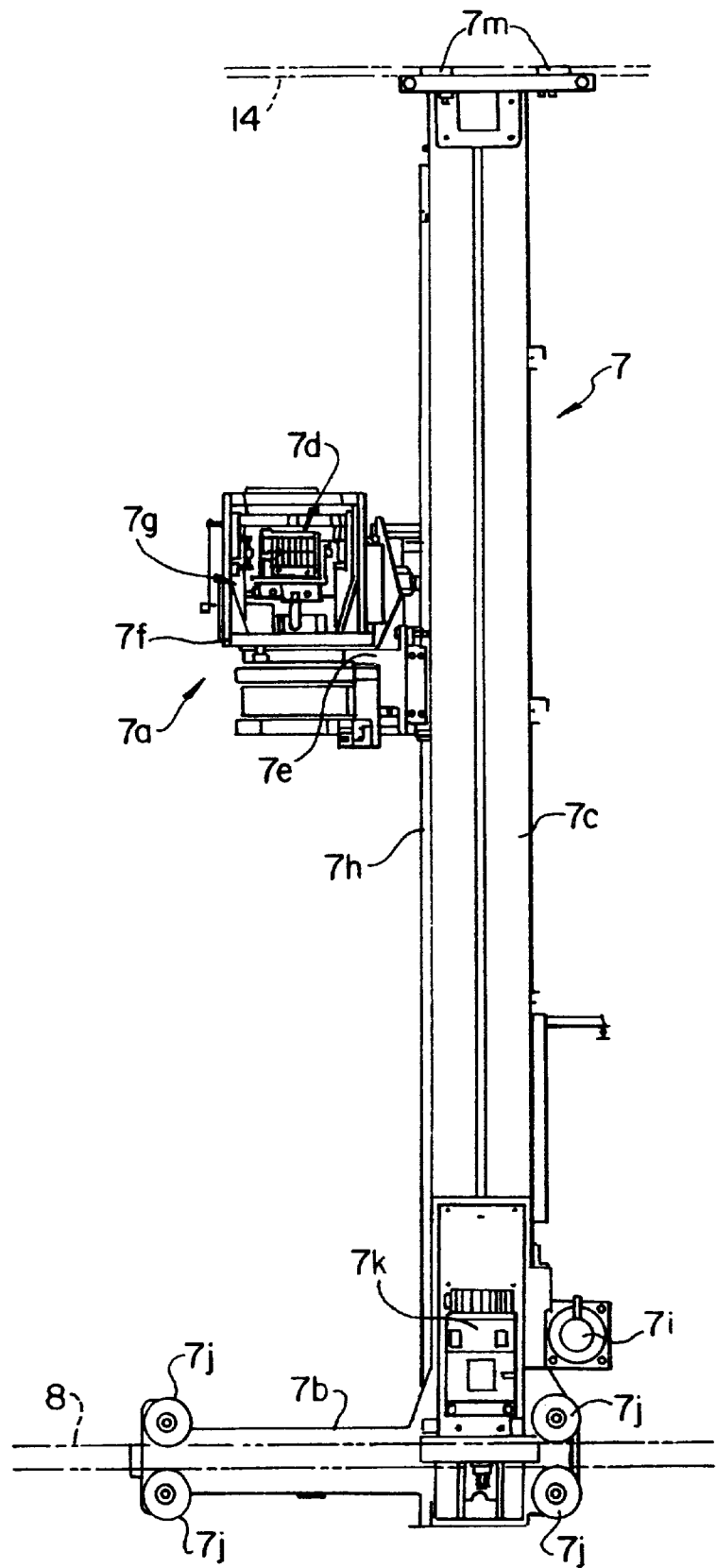
FIG. 3 is an elevational view of an accessor made according to a first embodiment of the invention.

FIG. 3 shows the accessor 7 of according to a preferred embodiment. As shown, the accessor 7 includes the hand assembly 7a, which in turn includes the hand mechanism 7d, the cart 7b, and the vertical column 7c.

The hand assembly 7a is configured to a carry picker section 7g including the hand mechanism 7d through a tilt base 7f on a support base 7e (a swivel base). A detailed description of the configuration of the hand assembly 7a will be provided below.

Description of the Hand Assembly

Figure 4:
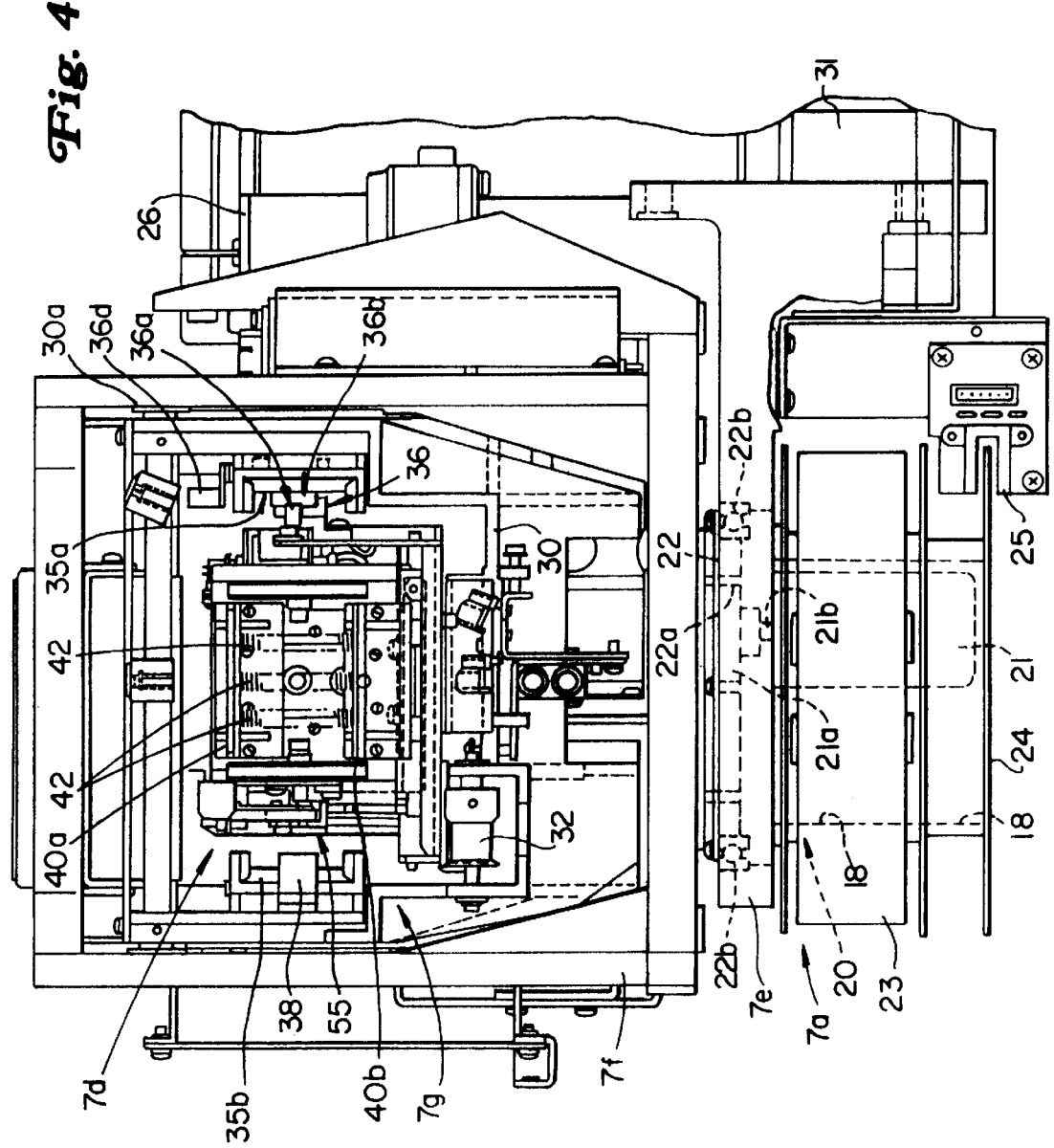
FIG. 4 is an elevational view of the hand assembly of FIG. 3.
Figure 5:
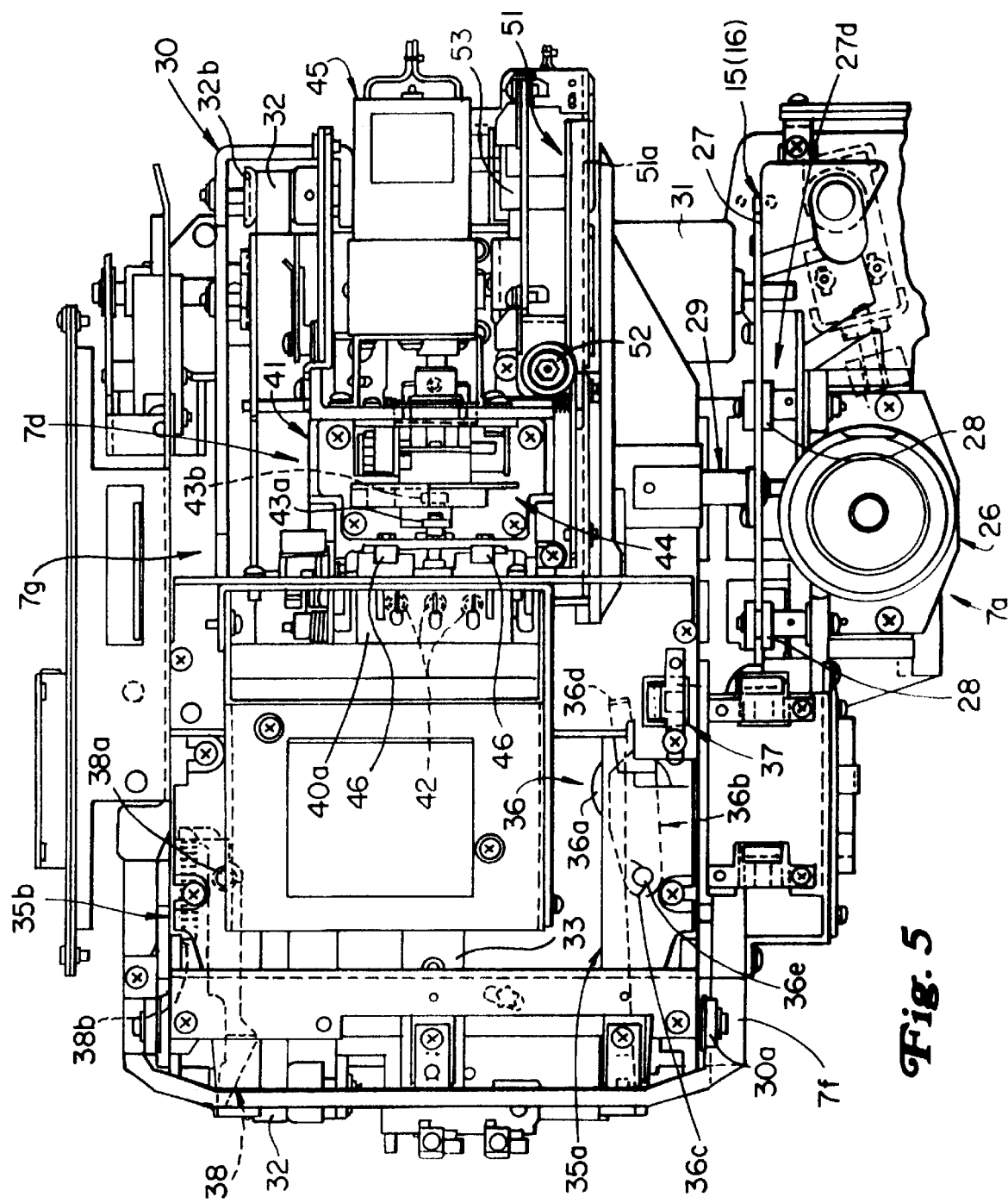
FIG. 5 is a plan view of the hand assembly of FIG. 3.

FIGS. 4 and 5 respectively show a front elevation and plan view of the hand assembly 7a of the accessor 7 of a preferred embodiment. The hand mechanism 7d is mounted on the picker section 7g (a picker base 30) to enable forward and backward movements. The hand mechanism 7d is driven in the forward and backward directions (i.e., the right and left directions in FIG. 5) along a LM guide 33 by a servo motor 31 and a timing belt 32, as will be described later with reference to FIGS. 6 to 10.

The picker section 7g (picker base 30) is rotatably mounted on the tilt base 7f and is configured to swing about a support axle (a rotational axis) 30a when driven by a swing drive mechanism 16. The swing drive mechanism 16 includes a tilt motor 26 mounted on the side of the support base 7e, a cam plate 27, guide rollers 28, and a cam follower 29. A detailed description of the tilt mechanism 15 and the swing drive mechanism 16 will be described later with reference to FIGS. 11 to 14.

As described previously, the storage shelves and the deck 5a are arranged on both sides of the accessor passage 9. Consequently, it is necessary to rotate the entire picker section 7g including the hand mechanism 7d in the direction which a cartridge 10 is to be inserted/extracted. For this reason, the accessor 7 (hand assembly 7a) is provided with a swivel mechanism 20 to swivel-drive the picker section 7g.

According to a preferred embodiment, the swivel mechanism 20 includes a first gear 22a, a second gear 21a, and a swivel drive motor 21. The second gear 21a is formed on the circumference of shaft 21b of the swivel drive motor 21. The teeth of the second gear 21a mesh with corresponding teeth of the first gear 22a formed on shaft 22. As shown in FIG. 4, the shaft 22 is secured to the bottom of the tilt base 7f on which the picker section 7g is mounted. Notably, the shaft 22 is rotatably supported on the support base (swivel base) 7e by a bearing 22b. In operation, the swivel drive motor 21 directly drives the second gear 21a, causing the first gear 22a to swivel the picker section 7g.

Preferably, the first gear 22a is formed of stainless steel or the like, whereas the second gear 21a is preferably formed of a softer material such as brass, aluminum-bronze or the like. In the embodiment shown, the internal diameter of shaft 22 (which is a diameter of the toothed portion of the first gear 22a) is 56 mm, and formed thereon are seventy teeth (each having a module of 0.8), e.g., 56/0.8=70. Moreover, the diameter of the second gear 21a is 24 mm, and formed thereon are thirty teeth, e.g., 24/0.8=30.

Figure 17:
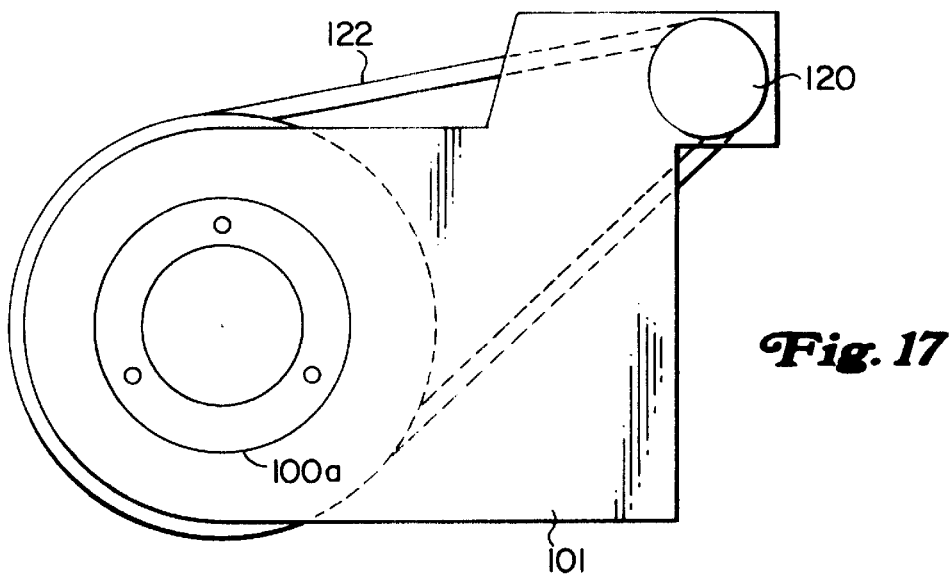
FIG. 17 is a plan view of a conventional swivel mechanism.
Figure 18:
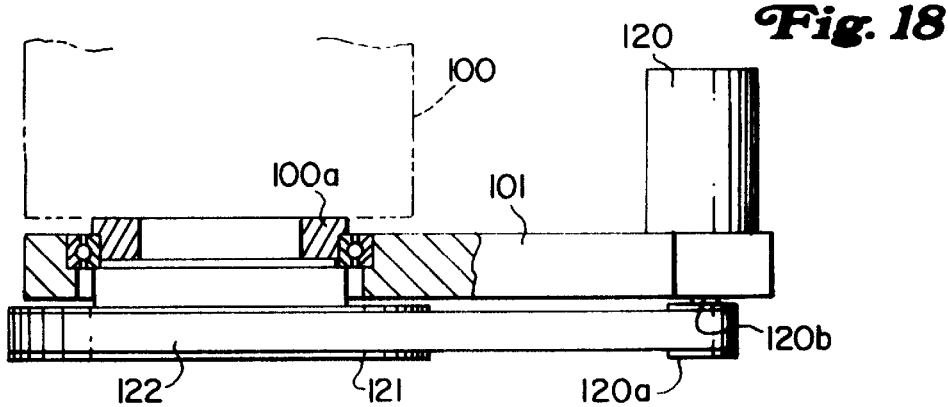
FIG. 18 is a cross-sectional view showing the swivel mechanism of FIG. 17.

Particularly noteworthy is the fact that in the swivel mechanism 20 of the preferred embodiment, the picker section 7g is directly driven by the gears 21a and 22a without the use of a timing belt. Consequently, the swivel mechanism 20 of the present invention facilitates a significant reduction in the operating space as compared to conventional swivel mechanisms (see, e.g., FIG. 17).

In addition to reducing the operating space of the swivel mechanism, the elimination of the timing belt facilitates an improvement in the positioning accuracy of the hand mechanism. In place of a timing belt, the preferred embodiment utilizes a slit disk 24 to detect a rotational position of the cylindrical member 18.

A shown in FIG. 4, the disk 24 is secured under the cylindrical member 18 connected to the bottom of the shaft 22. The disk 24 is integrally rotated with the cylindrical member 18, the shaft 22, and the tilt base 7f. The slit defined in the disk 24 is arranged to pass through a position of a photo sensor 25 installed on the support base 7e. The photo sensor detects the orientation of the hand mechanism 7d by sensing the slit (not shown).

As shown in the embodiment of FIG. 4, an additional reduction in space required for the swivel mechanism 20 may be accomplished by housing the swivel motor 21 within the cylindrical member 18.

It should be noted that only the portions related to the swivel mechanism 20 are shown in FIGS. 1(a) and (b). The tilt base 7f, the picker section 7g, the cable casing 23, and the disk 24 with slit are omitted for clarity.

Description of the Picker Section

Figure 6:
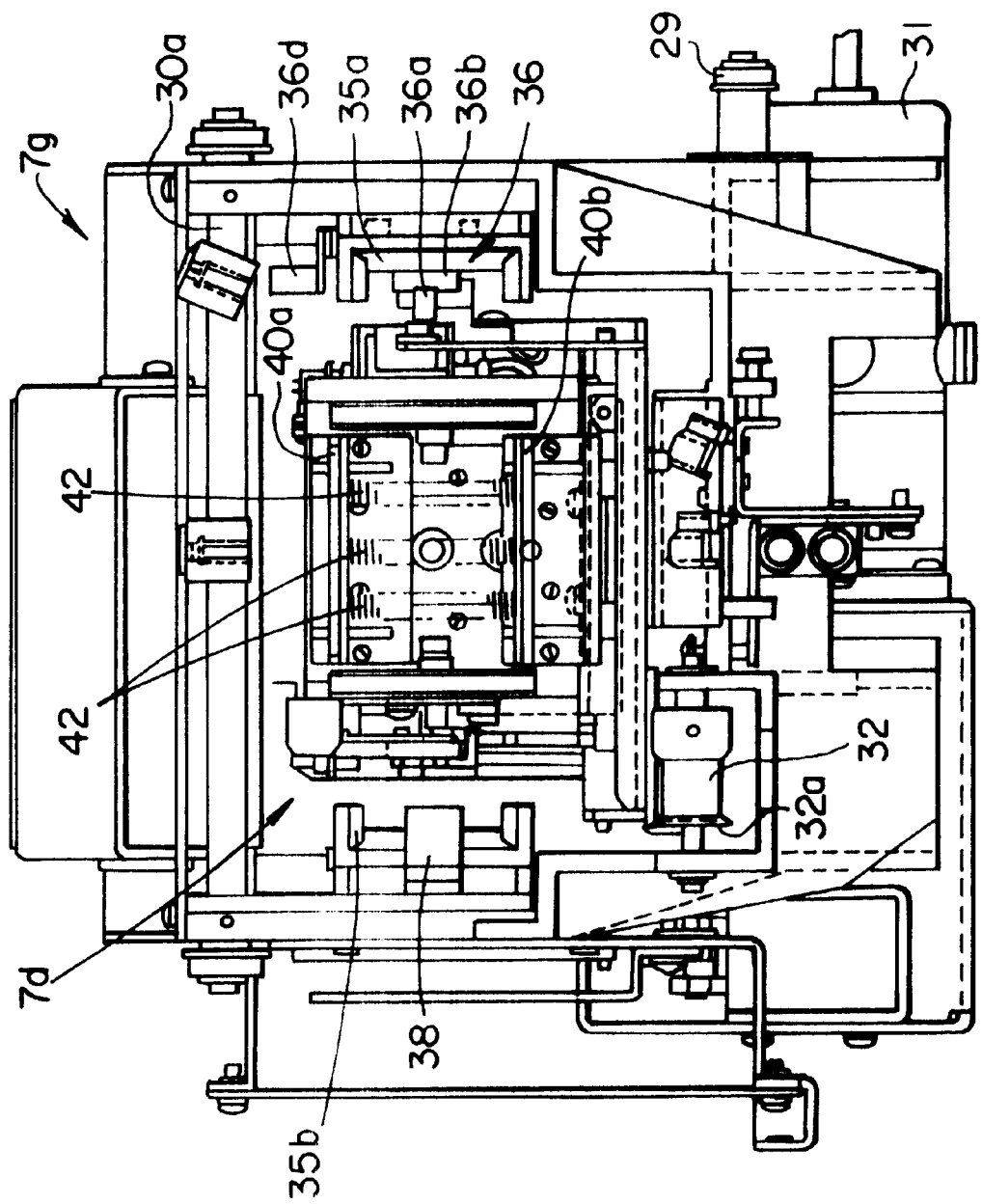
FIG. 6 is a plan view of the picker section of FIG. 3.
Figure 7:
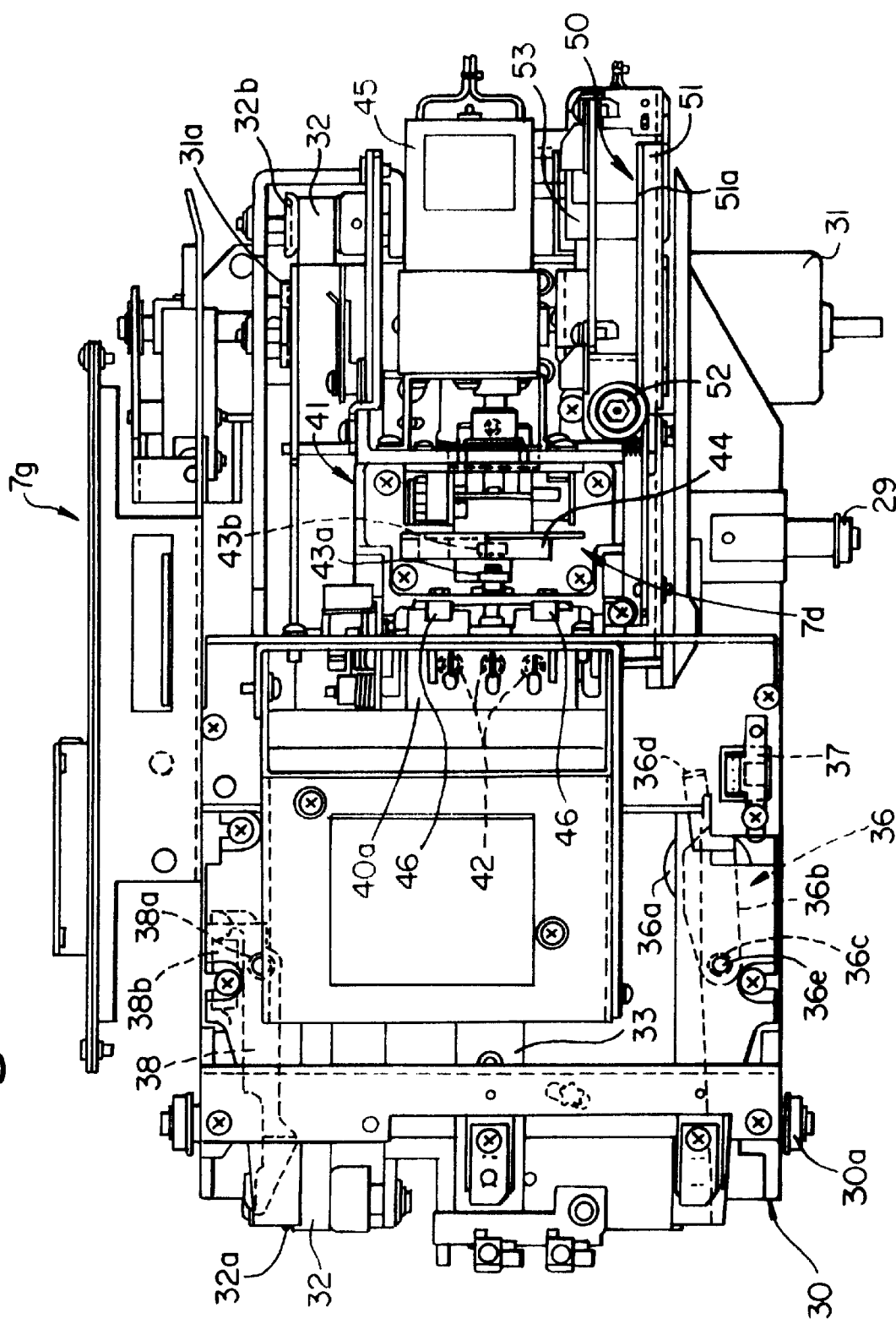
FIG. 7 is a cross-sectional view of the picker section of FIG. 3.
Figure 8:
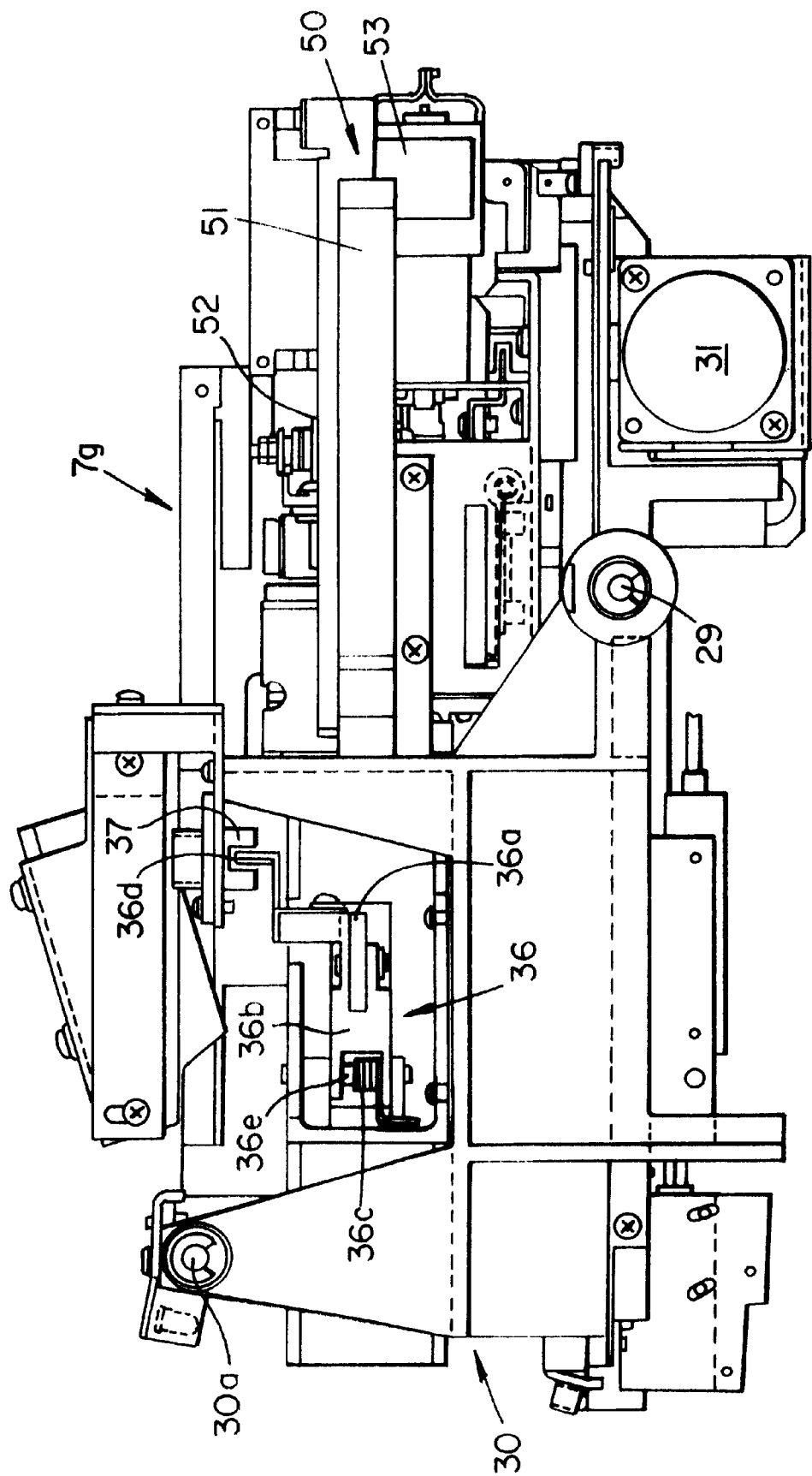
FIG. 8 is a side view of the picker section of FIG. 3.

FIGS. 6 to 10 show the picker section 7g of the accessor 7. As shown in FIGS. 6 to 8, the hand mechanism 7d is mounted on the picker section 7g. The hand mechanism 7d is capable of moving back and forth relative to the picker section, and is driven along the LM guide 33 by the servo motor 31 and the timing belt 32.

Figure 9:
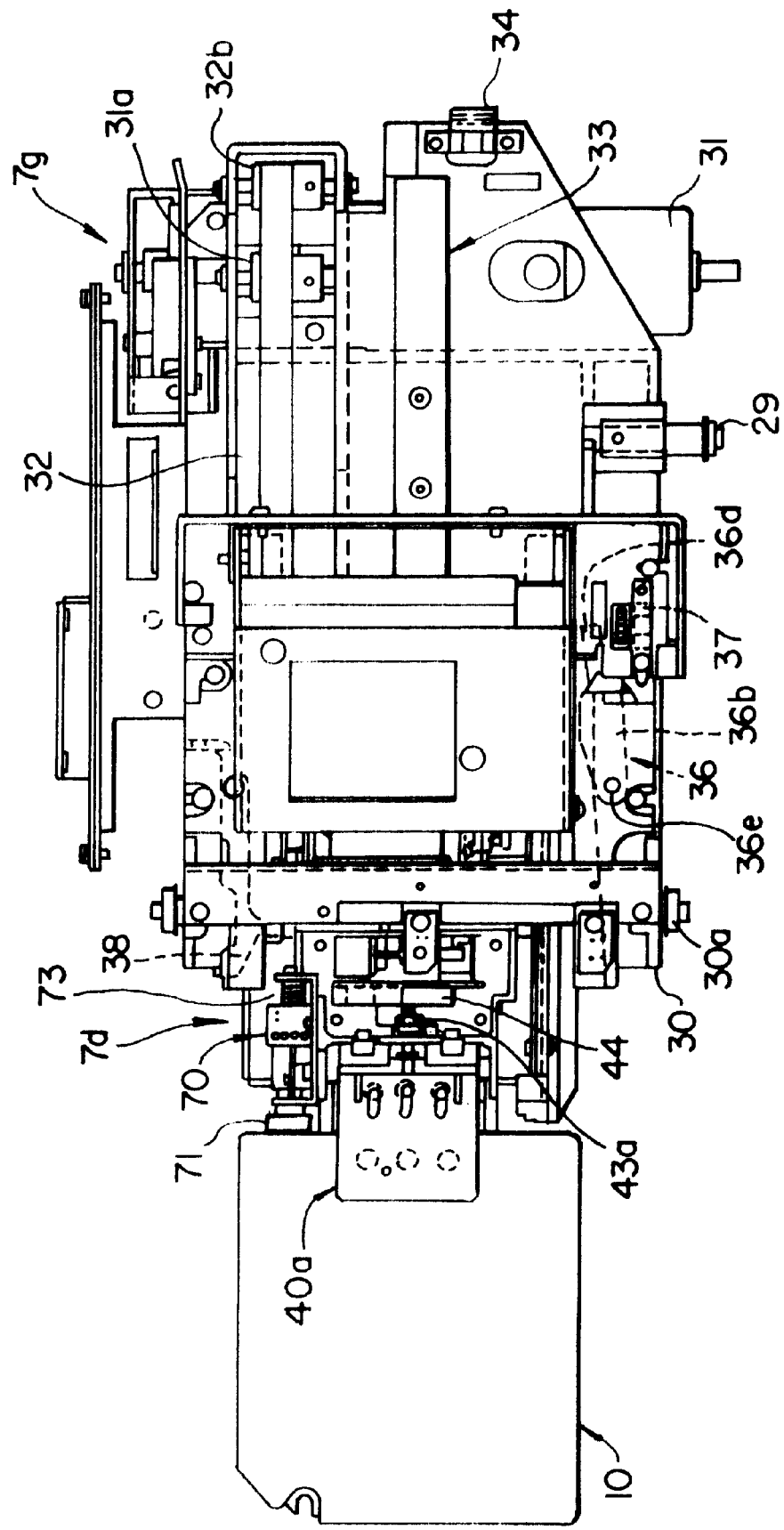
FIG. 9 is a plan view of the hand assembly of FIG. 5, running forward in the picker section of FIG. 7.

As shown in FIGS. 6, 7, 9 and 10, the timing belt 32 is wound around the pulleys 31a, 32a and 32b, and is guided by the guide roller 32c. The hand mechanism 7d as a whole is driven in the forward and rearward directions by the servo motor 31 by the timing belt 32. The hand mechanism 7d is arranged at either a retracted state (receding position) as shown in FIGS. 6 and 7, or a cartridge delivery state (an advancing position) of cartridge 10, as shown in FIGS. 9 and 10. A picker home sensor (photo sensor) 34 mounted on the rear end of the picker base 30 is used to determine the position (advancing or receding position) of the hand mechanism 7d.

According to one embodiment, the library apparatus is capable of handling multiple types of cartridges 10. In this embodiment the picker section 7g is provided with a cartridge type identifying mechanism including an actuator 36 and a photo sensor 37, for identifying the type of cartridge 10 held by the hand mechanism 7d.

The cartridge type identifying mechanism operates by causing the actuator 36 to follow the surface contour of the cartridge 10 held by the picker section 7g. The photo sensor 37 detects the displacement amount of the actuator 36, and the identification section of a CPU (not shown) controlling the movement of the accessor 7 identifies the type of the cartridge 10, based on the detected displacement amount.

The picker section 7g is equipped with left and right pairs of guide members 35a and 35b to guide the cartridge 10. The guide members support opposing sides of the cartridge as it is grasped by the hand mechanism 7d.

The actuator 36 includes a roller 36a arranged to protrude from the guide member 35a toward the cartridge side (FIG. 7). The roller 36a rotates around the axis perpendicular to the moving plane of the cartridge 10 while abutting one side of the cartridge 10. An arm 36b is fitted with the roller 36a, and enables swivel motion around the rotational shaft 36e perpendicular to the plane of movement of the cartridge 10. The arm 36b swings to follow the contour of the cartridge 10. A coil spring 36c urges the arm 36b to depress the roller 36a into contact with the surface of the cartridge 10. A flag 36d is arranged to protrude from arm 36b and moves in conjunction with the swinging movement of the arm 36b, and the displacement of the flag 36d is detected by the photo sensor 37 as the reflected light changes.

The photo sensor 37 is shaded by the flag 36d following the movement of the flag 36d, and the identification section identifies the type of the cartridge 10 based on shading condition information sent from the photo sensor 37. Using the identified cartridge type an appropriate deck or position on the storage shelf can be automatically identified by the apparatus. Thus, library apparatus of the present invention can simultaneously accommodate and process several different types (sizes) of cartridges.

According to yet another embodiment, the accessor 7 is provided with a diagnostic function for assessing the accuracy by which the insertion and the ejection of a diagnostic cartridge (not shown) are performed. The diagnostic cartridge may for example be stored in a predetermined diagnostic cell within the library apparatus 1(not shown).

Using the diagnostic cartridge, the accessor can determine whether there is a disorder in the dimension of the accessor 7 itself. In this manner, a smooth and stable operation of the accessor 7 is maintained. Moreover, the inadvertent use of the diagnostic cartridge is prevented because the diagnostic cartridge may be identified from among the multiple types of cartridges 10 by the identification section.

Repositioning of the Cartridge within the Picker Section

On occasion, improper positioning of a cartridge within the picker section may occur. Improper positioning makes it difficult to identify the cartridge type and may cause difficulty in handling the cartridge. Consequently, the cartridge must be repositioned within the picker section before it can either be identified and/or processed. Toward this end, a re-chucking operation is performed in which the accessor 7 is controlled to press the side surface of the cartridge 10 to the guide member 35b using the pressing force of the spring 36c. In this manner, the cartridge 10 can always be reset to a reference position where the end of the cartridge 10 is abutted against the guide member 35b. Moreover, reliable identification of the cartridge type is necessary to facilitate the selection of an appropriate storage shelf or deck in accordance with the cartridge type.

To prevent the cartridge 10 from jutting out of the picker section 7g during the cartridge re-chucking operation, the guide member 35b is provided with a hook 38 (retaining member). The hook 38 is arranged to protrude from the guide member 35b toward the side of the cartridge, and swing around the rotational axis 38a (FIG. 7). A loading force is applied to the hook 38 by the spring 38b. The hook 38 is pushed outward, against the urging force of the spring 38b, when the cartridge 10 receives a driving force from the servo motor 31 during a removal operation. Notably, the dead weight of the cartridge 10 is not sufficient to move the hook 38 against the spring force of the spring 38b. In this manner, the cartridge 10 is secured in place by the hook 38 and is prevented from falling out during the re-chucking of the cartridge 10.

Accordingly, the cartridges 10 can always be reset to a constant position (a reference position) where the surface of the other side of the cartridge 10 is abutted against the guide member 35b. Moreover, since it is possible to identify and position the cartridge 10 within the accessor 7, it is possible to facilitate the insertion of the cartridge 10 onto the storage shelf or the deck 5a in accordance with the cartridge type.

Therefore, even if the hand mechanism 7d inadvertently releases the cartridge 10 during a re-chucking operation (repositioning of the cartridge to a reference position), the hook 38 ensures that the cartridge 10 is held within the picker section 7g. Consequently, proper positioning of the cartridge 10 can be ensured.

Description of the Tilt Mechanism

The angle at which the cartridge is stored on the storage shelves differs from the insertion angle in which the cartridge is inserted into the CAS. Accordingly, the hand mechanism 7d must utilize appropriate cartridge insert-extract angles for each respective unit.

The cartridge insert-extract directions (angles) employed by the hand mechanism 7d of the preferred embodiment may be classified into two categories: a horizontal direction (0 degrees) and a downward direction which is oriented at a prescribed downward angle (e.g. 12 degrees) from the horizontal direction. The cartridges 10 are generally inserted and extracted from the deck 5a in the horizontal direction, whereas the cartridges 10 are installed in the storage shelf at a downward angle from the horizontal direction.

Figure 11A:
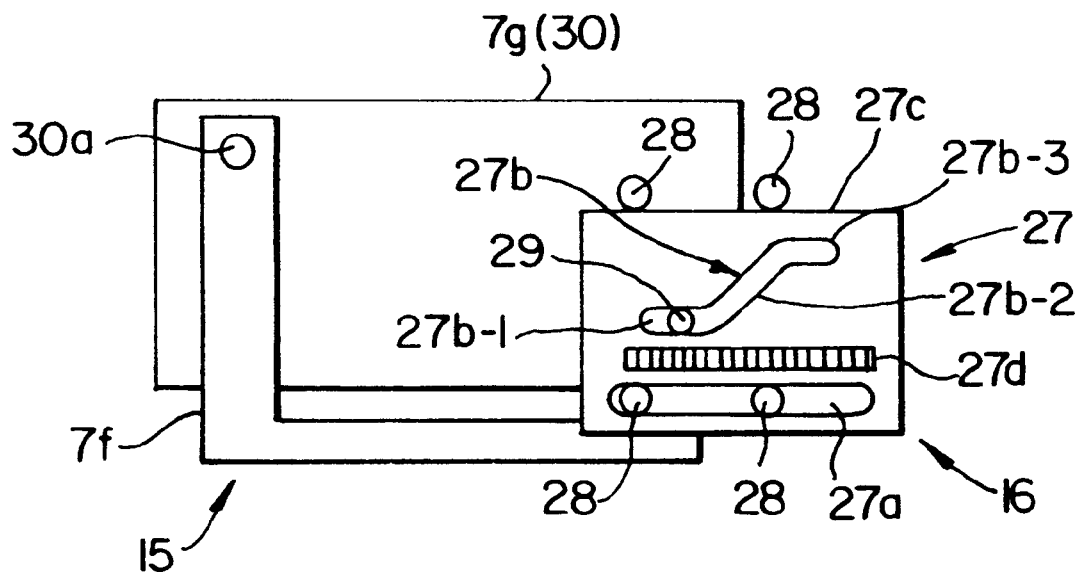
FIG. 11(a) is a side view of the tilting mechanism of the picker section.
Figure 11B:
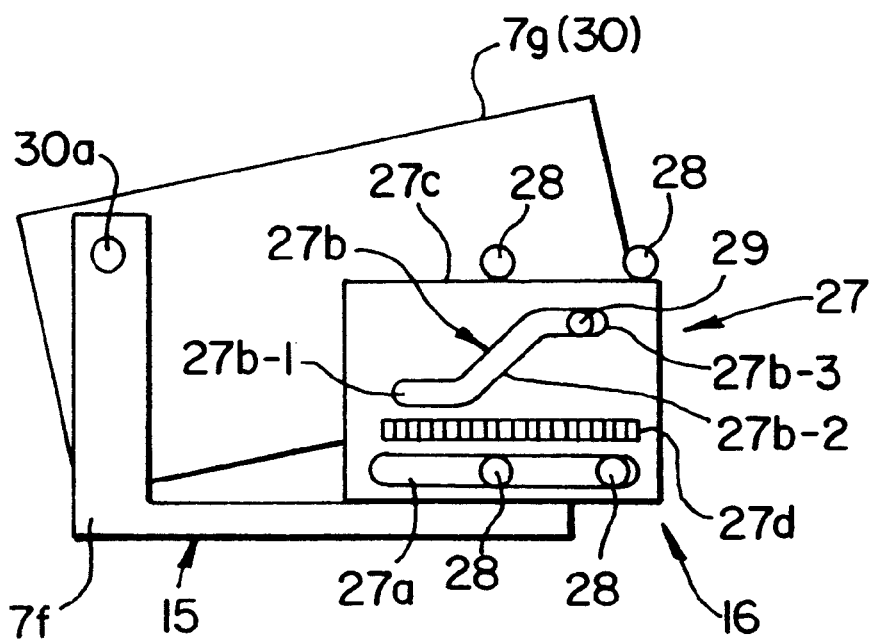
FIG. 11(b) is another side view of the tilting mechanism of FIG. 11(a) showing the tilted state.
Figure 12:
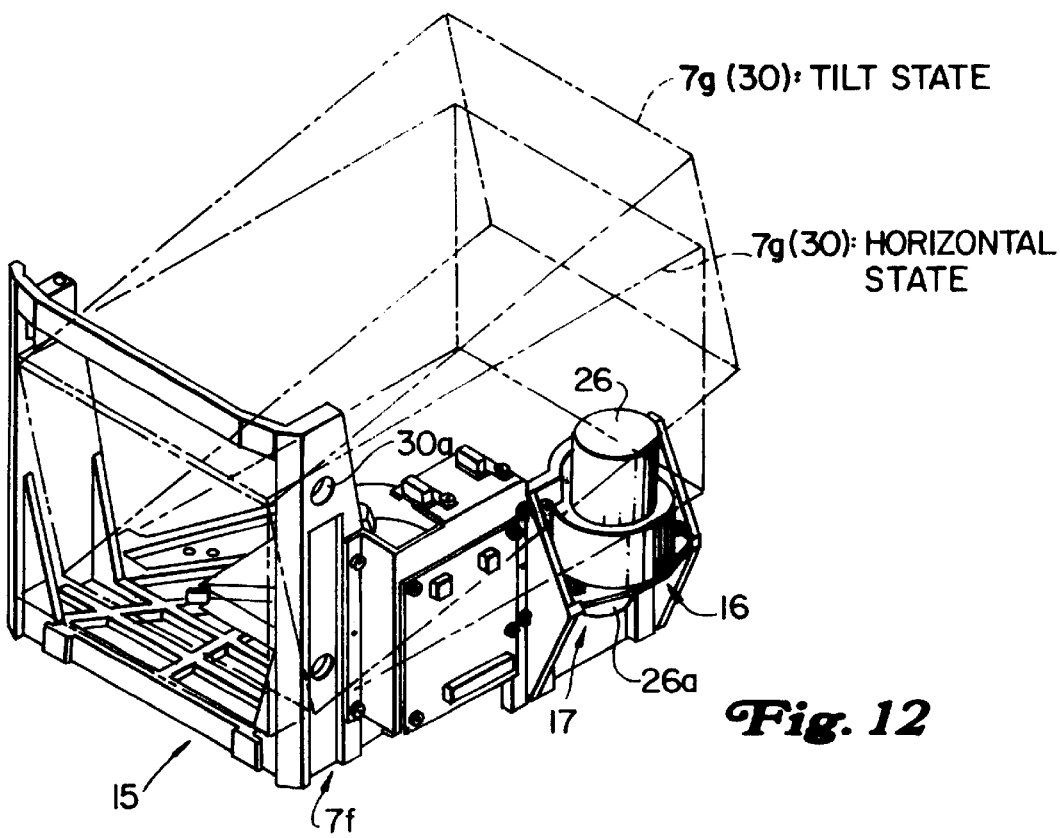
FIG. 12 is an isometric view of the tilt base of the accessor of FIG. 3.
Figure 13:
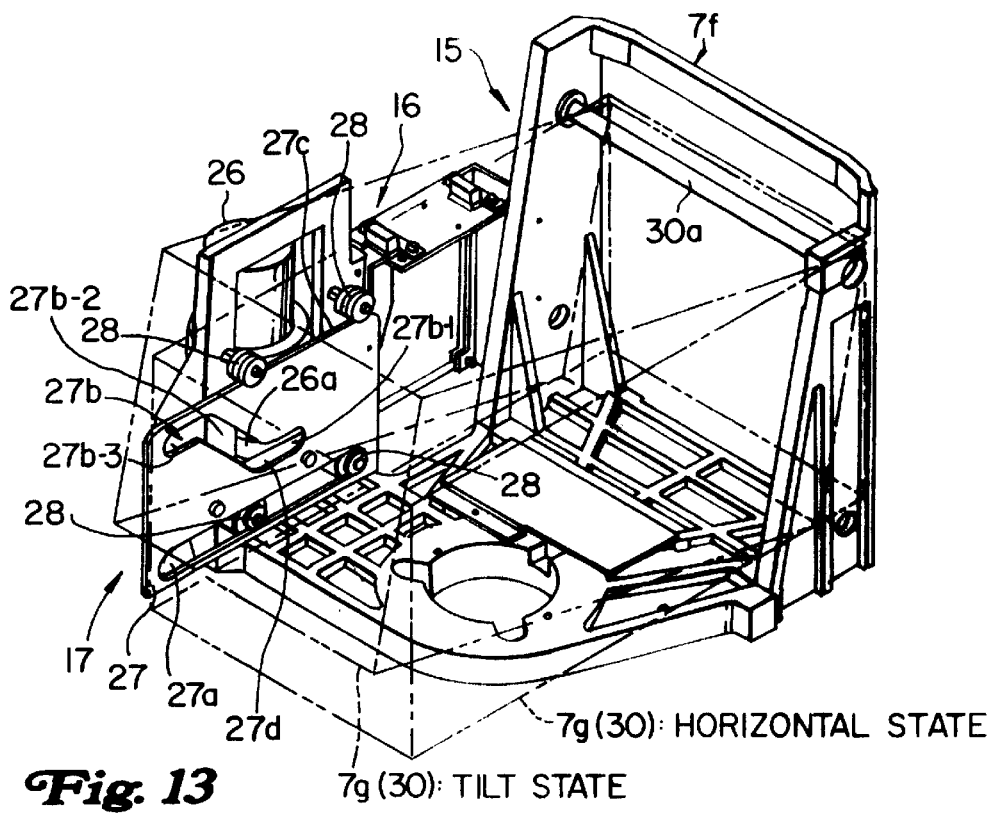
FIG. 13 is another isometric view of the tilt base of FIG. 12.
Figure 14:
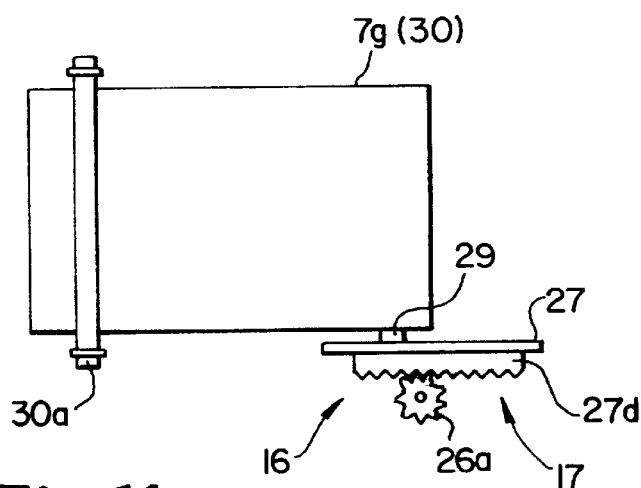
FIG. 14 is a plan view schematically showing the construction of the tilting mechanism of FIG. 12.

Accordingly, the tilting mechanism 15 (FIGS. 11(a) to 14) must adjust the angle of the cartridge inserting-extracting directions in relation to the horizontal plane. FIGS. 11(a) and 11(b) are side views showing tilting mechanism 15 employed in a preferred embodiment, and FIGS. 12 to 14 show the conditions of the tilting mechanism 15 installed in the accessor 7.

The picker section 7g is mounted on the tilt mechanism 15, which includes the tilt base 7f and the drive mechanism 16. In turn, the drive mechanism 16 includes the tilt motor 26, the cam plate 27, the guide roller 28, and the cam follower 29. In the embodiment shown, the driving system 16 is arranged in the lower back side of the picker section 7g (right hand side of FIGS. 11(a), (b) and FIG. 14).

The cam plate 27 is configured for movement along the tilt base 7f in the cartridge inserting-extracting directions and is guided by the cam follower 29. The drive mechanism 17 is provided to move the cam plate 27 in the cartridge inserting-extracting directions relative to the tilt base 7f.

As shown in FIGS. 11(a), (b) and FIG. 13, two pairs of guide rollers 28 are furnished at the rear side of the picker section 7g to support the cam plate 27. A guide way 27a is formed on the cam plate 27 in the forward and rearward directions, and the lower pair of guide rollers 28 are fitted into the guide way 27. On a horizontal upper edge 27c of the cam plate 27, the upper pair of guide rollers 28 abut a top surface of the cam 27. In this manner, the cam plate 27 is mounted on the tilt base 7f to enable movement in the cartridge inserting-extracting directions, while being guided by the guide rollers 28.

As shown in FIGS. 11(a) and (b), 13 and 14, the cam plate 27 is equipped with a rack 27d, and a pinion 26a is fitted to the driving axle (not shown) of the tilt motor 26. Rotational movement of the pinion 26a is converted into the linear movement of the cam plate 27 by the action of the rack 27d engaging with the pinion 26a, enabling the reciprocal movement of the cam plate 27 in the cartridge inserting-extracting directions (fore and aft directions).

Further, the cam plate 27 is provided with a swivel slot 27b in which the cam follower 29 fits. The swivel slot 27b has two horizontal portions 27b-1 and 27b-3 of different heights which are connected by a sloped portion 27-b2. As shown in FIG. 11(a), when the cam follower 29 is positioned in the horizontal portion 27b-1 of the long hole 27b, the picker section 7g is arranged horizontally and the cartridge inserting-extracting directions of the hand mechanism 7d are kept horizontal.

The rear horizontal portion 27b-3 is formed at a higher position than the front horizontal portion 27b-1. When the cam follower 29 is moved from the horizontal position 27b-1 to the horizontal position 27b-3 via the sloped portion 27b-2, the picker section 7g is placed in the tilting position by swinging around the support axle 30a (see FIG. 11(b)). In this manner, the cartridge inserting-extracting direction of the hand mechanism 7d is oriented to the downward direction from the horizontal direction at the prescribed angle (e.g., 12 degrees).

Structure for Ensuring Reliable Positioning Accuracy

The tilt mechanism 15 of a preferred embodiment facilitates improved accuracy of the cartridge inserting-extracting angle. Notably, accuracy at the head end of the picker section can be improved by changing the relative positioning of the fulcrum and dynamic points of the picker section.

As illustrated in FIG. 14, the support axle 30a (fulcrum of the tilt motion) is arranged in front of the picker section 7g, and the cam follower 29 (dynamic point) is arranged in the rear side of the picker section 7g. A distance L1 from the fulcrum to the dynamic point (the cam follow 29) is larger than the distance L2 from the fulcrum (the support axle 30a) to the head end of the hand mechanism 7d (hand members 40a, 40b). Notably, by ensuring that the ratio L2:L1 in the tilt mechanism 15 is less than one (i.e. L2>L1) it is possible to prevent dimensional error at the dynamic point (the cam follower 29) from being amplified at the head end point of the hand mechanism 7d.

Accordingly, the tilt mechanism 15 enables highly reliable positioning accuracy, and makes it possible to perform insertion-extraction of cartridges directly from the deck 5a without providing a cartridge feeder at every deck 5a, resulting in downsizing and cost reduction of the library unit 1.

Description of Hand Mechanism

Figure 15:
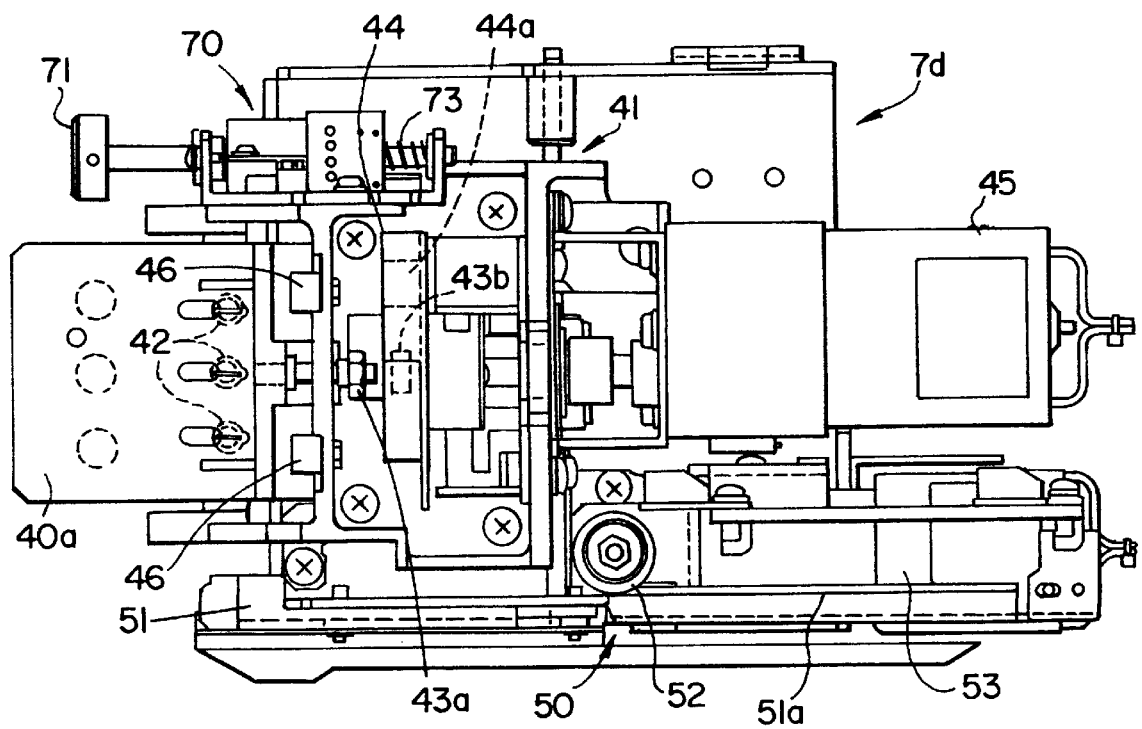
FIG. 15 is a plan view of the hand mechanism of FIG. 4.
Figure 16:
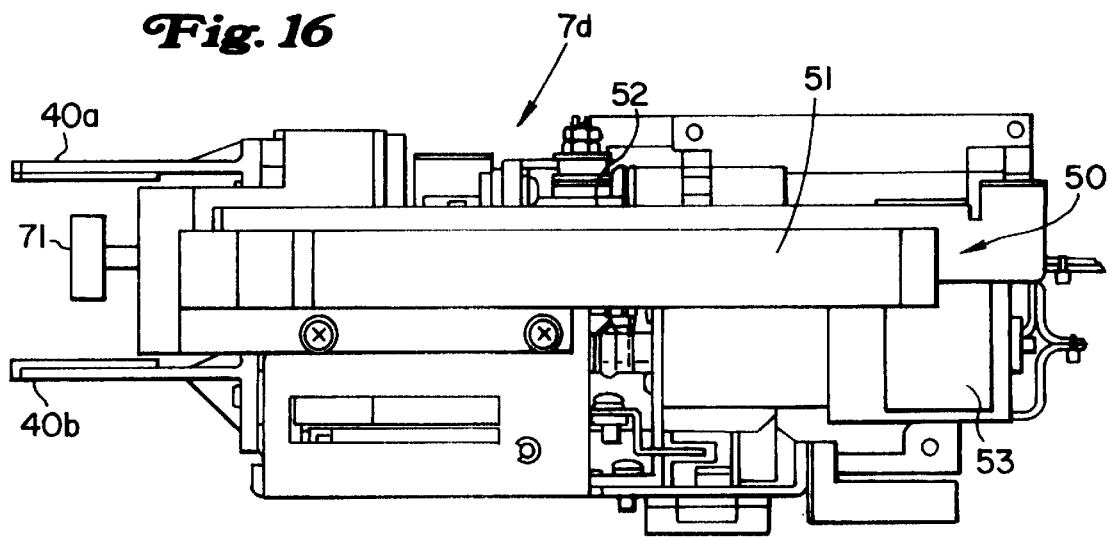
FIG. 16 is a side view of the hand mechanism of FIG. 4.

As shown in FIGS. 15 and 16, the hand mechanism 7d includes a pair of hand members 40a and 40b, hand base 41, spring 42, cam followers 43a and 43b, cam 44, open-close motor 45, linear way 46, mounting mechanism 50, and CIP/CSP unit 70.

The hand members 40a and 40b (FIG. 16) hold the cartridge 10 by abutting the cartridge 10 from above and below (FIG. 16). As seen in FIG. 15, the hand members (only hand member 40a is shown) are mounted on the hand base 41 to enable sliding up and down via a pair of linear ways (a rectilinear bearing, LM guide) 46, 46. Three springs 42 installed between the hand members 40a and 40b bias the hand members 40a, 40b in the closing direction in which the cartridge 10 is chucked.

The hand members 40a and 40b are respectively provided with a pair of cam followers 43a and 43b, and a cam 44 is positioned therebetween. The cam 44 is equipped with a larger diameter portion which widens a gap between the cam followers 43a and 43b against the load applied by the springs 42, causing the hand members 40a and 40b to release the cartridge. The cam 44 is further equipped with a smaller diameter portion which provides a gap between the cam followers 43a and 43b, and a locking groove 44a.

The locking groove 44a functions as a locking mechanism which locks the hand members 40a and 40b by retaining the lower cam follower 43b, thereby keeping the cartridge 10 chucked.

The hand open-close motor 45 is used to rotationally drive the cam 44 between the hand open position (placing the larger diameter portion between the cam followers 43a and 43b), the cartridge chucking position (placing the smaller diameter portion between the cam followers 43a and 43b), and the lock position (securing the hand members 40a and 40b using the locking groove 44a at the state which the cartridge 10 is chucked).

Further, the hand mechanism 7d is also equipped with a mounting mechanism 50 to insert the cartridge 10 into the MTU 5a by applying a pressing force to the cartridge 10. The mounting mechanism 50 of a preferred embodiment includes a mounting arm 51, pinion 52, and a mounting arm drive motor 53.

The mounting arm 51 is installed to enable linear movement toward the direction in which the cartridge 10 is inserted into the deck 5a. The pinion 52 meshes with the rack 51a, and is rotationally driven by the motor 53 to thrust the mounting arm 51 in the direction of the cartridge loading motion.

The mounting mechanism 50 is also provided with a buffer mechanism (not shown) to absorb an extra force where a pressing force over a prescribed load is applied to the cartridge 10. The buffer mechanism is configured, for example, to interpose a resin bearing or a resin spacer between the pinion 52 and the driving shaft (not shown) of the motor 53.

Conversely, the hand mechanism 7d is equipped with the CIP/CSP unit 70 which includes a CIP (Cartridge in Picker; not shown) for sensing whether a cartridge 10 is inserted between the hand members 40a and 40b, and a CSP (Cartridge Secured Position; not shown) for sensing whether the rear end of the cartridge 10 has reached the prescribed position after the insertion of the cartridge has been detected by the CIP.

The CIP and CSP each include a photo sensor, and are configured to detect an insertion state of the cartridge 10 as well as a state which the cartridge 10 is securely held. An actuator 71 is biased in a forward direction (the left direction in FIG. 11) by a spring 73. As a cartridge 10 is inserted between the hand members 40a and 40b, the actuator 71 abuts the rear end of the cartridge 10 (see FIGS. 9 and 10) and is forced against the load of the spring 73. This in turn drives the flag causing the CIP and the CSP to activate (in that order).

When the cam 44 is arranged in the hand open position by driving the motor 45, the distance between the cam followers 43a and 43b is widened by the large diameter portion of the cam 44, and hand members 40a and 40b are released.

Correspondingly, when the cam 44 is located in the cartridge chucking position by the motor 45 (with a cartridge 10 is inserted between the hand members 40a and 40b), the hand members 40a and 40b receive the spring load of the spring 42 and abut the upper and lower surfaces of cartridge 10, i.e., chuck the cartridge 10. At this step, since a gap has been formed between the cam followers 43a and 43b, the hand members 40a and 40b move up and down as much as the gap (play) allows. Therefore, even if there is a slight offset between the cartridge inserting entrance of the deck 5a and the cartridge 10 chucked by the hand mechanism 7d, the offset may be compensated by the above described up-and-down movement, and the gap is utilized as a buffer to successfully insert the cartridge 10 into the deck 5a.

When the cam 44 is located in the locked position by the motor 45, the cam follower 43b is retained by the lock groove 44a, and the hand members 40a and 40b are secured against the hand base 41. For example, when extracting the cartridge 10 from the storage shelf, the cartridge 10 must only be lifted slightly to undo the cartridge 10 from a retaining member which secures the cartridge 10 on the storage shelf. During the cartridge extracting process the locking mechanism (the lock groove 44a of the cam 44) is utilized to prevent the up/down play of the hand members 40a and 40b, thereby making it possible to assuredly lift the cartridge 10.

Moreover, to ensure that the cartridge is precisely loaded into the inner part of the deck 5a, pressure is exerted on the cartridge by the mounting arm 51 as follows. The cartridge 10 is inserted into the deck 5a, the hand members 40a and 40b are opened (de-chucked), and the mounting arm 51 is driven in the cartridge loading direction by the interaction of the pinion 52 and the rack 51a.

In the event that pressure exceeding the prescribed level is applied to the cartridge 10, the exceeded amount of pressing force may be absorbed by a buffering mechanism installed between the pinion 52 and the driving shaft of the motor 53. In the buffering mechanism, a slip is caused through a resin bearing or a resin spacers between the pinion 52 and the driving shaft of the motor 53, and the exceeded amount of the pressuring force is absorbed by the friction force at that time. In this manner, it is possible to prevent an excessive amount of pressure from being applied to the cartridge 10. Therefore, even if an overload is applied to the cartridge 10, it is possible to preserve the cartridge 10 and its periphery portion, as well as the mounting mechanism 50 and the motor 53.

As described above, since the hand mechanism 7d is multi-functioned, it is possible to carry out directly inserting and extracting the cartridge 10 between the deck 5a and the hand mechanism 7d, without the intervention of the cartridge delivery mechanism (feeder), and it is possible to downsize the library unit 1 and to reduce cost.

It should be appreciated that a cartridge transfer robot and a library unit including the same has been shown and described. The cartridge transfer robot of the present invention has a picker section which can be directly swiveled by using an external gear meshing with an internal gear, without using a timing belt. As a result, the swivel mechanism of the picker section can be downsized, and the required installation space is significantly reduced. Also, the problem of control accuracy of the swiveling motion is eliminated and there is an effect of assuring the precise positioning of the head end of the hand mechanism.

While various embodiments of the present invention have been shown and described, it should be appreciated that other modifications, substitutions and alternatives may be apparent to one of ordinary skill in the art. For example, the drive gear could be outside of, under or over the picker section gear instead of inside it, as described. Such modifications, substitutions and alternatives can be made without departing from the spirit and scope of the invention, which should be determined from the appended claims.

Various features of the invention are set forth in the appended claims.

What is claimed is:

1. A cartridge transfer robot used to transport cartridges in a library apparatus having storage shelves to house data storage cartridges, cartridge access stations to load or unload the cartridges, and decks to access recording data within the cartridges, said cartridge transfer robot comprising:

a picker section to transfer cartridges between said storage shelves, said cartridges access stations and said decks, said picker section having a hand mechanism for chucking a cartridge and inserting-extracting the cartridge in/from one of the decks, the cartridge access stations, and the storage shelves;

a transfer mechanism to move said picker section to a prescribed position; and a swivel mechanism to swivel said picker section, said swivel mechanism including:
a first gear mounted coaxially to a swivel axis of said picker section and integrated into said picker section;
a second gear meshing with first gear; and
a drive mechanism to directly drive said second gear, thereby driving said picker section.

2. A cartridge transfer robot according to claim 1, wherein said second gear is an internal gear and said first gear is an external gear, and said internal gear is positioned inside said external gear.

3. A cartridge transfer robot according to claim 1, wherein said transfer mechanism comprises:

a cart for moving said picker section along a horizontal direction of the library unit; and a moving mechanism for moving said hand mechanism along a vertical direction of the library unit;

a support base fitted to a vertical column of the library unit and configured for movement along a vertical direction of the library unit; and a tilt mechanism mounted to said support base and configured for rotation about a rotational axis, said tilt mechanism supporting said picker section, whereby said tilt mechanism adjusts the angle of the cartridge inserting-extracting directions in relation to a horizontal direction of the library unit.

4. A cartridge transfer robot according to claim 3, wherein said tilt mechanism comprises:

a tilt base; and a drive mechanism for driving said tilt base;

a tilt motor mounted to said support base;

a cam plate configured for movement in the cartridge inserting-extracting directions along said tilt base, said cam plate being provided with a rack;

a cam follower configured for movement along said vertical direction of the library unit and being guided by said cam plate; and a pinion fitted to a driving axle of said tilt motor and meshing with said rack, whereby rotational movement of said pinion is converted into the linear movement of said cam plate enabling the reciprocal movement of said cam plate in the cartridge inserting-extracting directions.

5. A cartridge transfer robot according to claim 4, wherein said cam plate is provided with a swivel slot in which said cam follower fits, said swivel slot having first and second horizontal portions of different heights and a sloped third portion connecting said first and second portions, wherein when said cam follower is positioned in said first horizontal portion, said picker section is arranged horizontally and the cartridge inserting-extracting directions of said hand mechanism are kept horizontal, and wherein when said cam follower is moved from said first horizontal portion to said second horizontal position via said sloped third portion, said picker section is placed in a tilting position by swinging around said rotational axis and the cartridge inserting-extracting direction of said hand mechanism is oriented at a prescribed downward direction from the horizontal direction of the library unit.

6. A cartridge transfer robot according to claim 5, wherein said rotational axis of said tilt mechanism defines a fulcrum of the tilt motion, the position of said cam follower defines a dynamic point, and a distance L1 from the fulcrum to the dynamic point is larger than the distance L2 from the fulcrum to a head end of said hand mechanism.

7. A cartridge transfer robot according to claim 1, further including a cartridge type identifying mechanism, comprising:

means for following the surface contour of a cartridge grasped by said hand mechanism; and a sensor for detecting the amount of displacement marked by said surface contour following means, wherein a cartridge type is identified in accordance with the detected displacement amount.

8. A cartridge transfer robot according to claim 7, wherein said surface contour following means includes:

an arm mounted to follow the contour of the cartridge and being fitted with a roller, said roller rotating around an axis perpendicular to the moving plane of the cartridge while abutting one side of the cartridge;

a flag arranged to protrude from said arm, and moving in conjunction with a swinging movement of said arm; and a photo sensor detecting the displacement amount of marked said arm based on a shading condition information caused by said flag.

9. A cartridge transfer robot according to claim 1, further comprising:

a CIP sensor for sensing whether a cartridge is inserted in said hand mechanism; and a CSP sensor for sensing whether the rear end of the cartridge has reached a prescribed position within said hand mechanism after the insertion of the cartridge has been detected by said CIP.

10. A library housing plural data storage cartridges, comprising:

a storage shelf for housing at least one cartridge:
  a cartridge access station for loading or unloading a cartridge;
  a deck to access recording data within the cartridge; and
  a cartridge transfer robot having:
    a picker section to transfer cartridges between said storage shelf, said cartridge access station and said deck, said picker section having a hand mechanism for chucking a cartridge and inserting-extracting the cartridge in/from said deck, said cartridge access station, and said storage shelf;
    a transfer mechanism to move said picker section to a prescribed position; and
    a swivel mechanism provided on said picker section to swivel said picker section, said swivel mechanism including:
      a first gear mounted coaxially to a swivel axis of said picker section and integrated into said picker section;
      a second gear meshing with said first gear; and
      a drive mechanism for directly driving said second gear.

11. A library apparatus according to claim 10, wherein said transfer mechanism comprises:
  a cart for moving said a picker section along a horizontal direction of said library apparatus;
  a moving mechanism for moving said hand mechanism along a vertical direction of the library apparatus;
  a support base fitted to a vertical column of the library apparatus and configured for movement along said vertical column; and
  a tilt mechanism rotatably mounted to said support base so as to be able to swing about a rotational axis, said tilt mechanism supporting said picker section, whereby said tilt mechanism is used to adjust the angle of the cartridge inserting-extracting directions in relation to horizontal direction of the library apparatus.

12. A library apparatus according to claim 11, wherein said tilt mechanism comprises:
  a tilt base; and
  a drive mechanism for driving said tilt base, said drive mechanism includes:
    a tilt motor mounted said support base;
    a cam plate configured for movement in the cartridge inserting-extracting directions along said tilt base, said cam plate being provided with a rack;
    a cam follower configured for movement in a vertical direction of the library apparatus and being guided by said cam plate; and
    a pinion fitted to a driving axle of said tilt motor meshes with said rack, whereby rotational movement of said pinion is converted into the linear movement of said cam plate enabling the reciprocal movement of said cam plate in the cartridge inserting-extracting directions.

13. A library apparatus according to claim 12, wherein said cam plate is provided with a swivel slot in which said cam follower fits, said swivel slot having first and second horizontal portions of different heights and a sloped third portion connecting said first and second portions,
  wherein when said cam follower is positioned in said first horizontal portion said picker section is arranged horizontally and the cartridge inserting-extracting directions of said hand mechanism are kept horizontal, and
  wherein when said cam follower is moved from said first horizontal portion to said second horizontal position via said sloped third portion, said picker section is placed in a tilting position by swinging around said rotational axis and the cartridge inserting-extracting direction of said hand mechanism is oriented at a prescribed downward direction from the horizontal direction of the library apparatus.

14. A library apparatus according to claim 13, wherein said rotational axis of said tilt mechanism defines a fulcrum of the tilt motion, the position of said cam follower of said defines a dynamic point, and a distance L1 from the fulcrum to the dynamic point is larger than the distance L2 from the fulcrum to a head end of said hand mechanism.

15. A library apparatus according to claim 10, further including a cartridge type identifying mechanism comprising:
  means for following the surface contour of a cartridge grasped by said hand mechanism; and
  a sensor for detecting the amount of displacement marked by said surface contour following means, wherein a cartridge type is identified in accordance with the detected displacement amount.

16. A library apparatus according to claim 15, wherein said surface contour following means includes:
  an arm mounted to follow the contour of the cartridge and being fitted with a roller, said roller rotating around an axis perpendicular to the moving plane of the cartridge while abutting one side of the cartridge;
  a flag arranged to protrude from said arm and moving in conjunction with the swinging movement of said arm; and
  a photo sensor detecting the displacement amount of marked said arm based on a shading condition information.

17. A library apparatus according to claim 10, further comprising:
  a CIP sensor for sensing whether a cartridge is inserted in said hand mechanism; and
  a CSP sensor for sensing whether the rear end of the cartridge has reached a prescribed position within said hand mechanism after the insertion of the cartridge has been detected by said CIP.

18. A library apparatus according to claim 10, wherein said second gear is an internal gear and said first gear is an external gear, and said internal gear is positioned inside said external gear.

19. A library apparatus housing plural storage cartridges, comprising:
  storage shelves for housing cartridges; and
  a cartridge transfer robot having:
    a picker section to transfer cartridges between said storage shelves, said picker section having a hand mechanism for chucking a cartridge and inserting-extracting the cartridge in/from said storage shelves;
    a transfer mechanism to move said picker section to a prescribed position; and
    a swivel mechanism provided on said picker section to swivel said picker section, said swivel mechanism including:
      a first gear mounted coaxially to a swivel axis of said picker section and integrated into said picker section;
      a second gear meshing with said first gear; and a drive mechanism for directly driving said second gear.

* * * * *